US005883206A

United States Patent [19]
Ittel et al.

[11] Patent Number: 5,883,206
[45] Date of Patent: Mar. 16, 1999

[54] FREE RADICAL POLYMER CHAIN INITIATION WITH UNREACTIVE UNSATURATES

[75] Inventors: Steven Dale Ittel, Wilmington; Alexei Alexeyevich Gridnev, Greenville, both of Del.

[73] Assignee: E. I. du Pont de Nemours and Company, Wilmington, Del.

[21] Appl. No.: 818,860

[22] Filed: Mar. 17, 1997

Related U.S. Application Data

[60] Provisional application No. 60/013,799, Mar. 21, 1996.
[51] Int. Cl.⁶ .................................. C08F 2/38; C08F 4/80
[52] U.S. Cl. ..................... 526/161; 526/171; 526/329.7
[58] Field of Search ............................. 526/161, 171; 525/326.1, 377

[56] References Cited

U.S. PATENT DOCUMENTS 4,886,861  12/1989  Janowicz .................................. 526/145
5,587,431  12/1996  Gridnev et al. ........................... 525/269

OTHER PUBLICATIONS

Haddleton et al., *Macromolecules*, 29(1), 481, 1996.

Davis et al., *Macromol. Theory Simul.*, 4, 195–208 1995.

Davis et al., *J. Macromolecular Science—Rev. Macromol. Chem. Phys.*, C34(2), 243–324 1994.

*Primary Examiner*—Jeffrey Smith
*Assistant Examiner*—Wu C. Cheng

[57] ABSTRACT

This invention relates to a method by which olefinically-unsaturated organic molecules, which are otherwise nonpolymerizable, may be homopolymerized or copolymerized with conventional monomers through the use of cobalt chain transfer catalysts. The resulting macromonomers contain one terminal functional group and a terminal double bond on the other end of the chain.

8 Claims, No Drawings

FREE RADICAL POLYMER CHAIN INITIATION WITH UNREACTIVE UNSATURATES

FIELD OF THE INVENTION

This invention relates to a method by which olefinically-unsaturated organic molecules, which are otherwise unreactive and non-polymerizable, may be used to initiate polymer chains from free-radical monomers through the use of cobalt chain transfer catalysis, and the products of that method.

TECHNICAL BACKGROUND

It is well known that there are many olefinically unsaturated organic compounds which are essentially inert to a free radical polymerization process, either to form homopolymers or to form copolymers with conventional monomers such as methacrylates, acrylates, styrene and the like. The expression "being essentially inert" is taken to mean herein that these olefinically unsaturated molecules are not homopolymerized and that they copolymerize with conventional monomers at levels of less than ten mole percent, even when present in a tenfold excess relative to the conventional monomers.

U.S. Pat. No. 5,587,431 describes a method of preparing compositions of terminally unsaturated polymers by reinitiating the terminated ends of a terminally unsaturated oligomer with additional chain transfer catalyst (CTC) for further oligomerization.

Several publications have discussed the copolymerization of methacrylic dimers, but no mention is made of the "reinitiation" of the dimers involved. See D. M. Haddleton, et al., Macromolecules 29 (1996), p. 481ff; T. P. Davis, et al., Macromol. Theory Simul. 4(1995), p. 195ff; T. P. Davis, et al., J. Macromolecular Science-Rev. Macromol. Chem. Phys., C34(2) (1994), p. 243ff.

The invention herein described demonstrates the copolymerization of otherwise non-polymerizable organic molecules (herein referred to as "UO"), rather than oligomers or macromonomers, and the production of functionalized monomers and macromonomers from these UO's.

SUMMARY OF THE INVENTION

This invention concerns an improvement in a process for the free-radical polymerization of one or more monomers, hereinafter referred to as "Conventional Monomers" (CM). The polymers formed have vinyl-terminated end groups. The polymerization is initiated by a functional group derived from an olefinically-unsaturated organic molecule. The CM useful in the process have the formula $$CH_2=CXY$$

wherein

X is selected from the group consisting of $CH_3$, and $CH_2OH$;

Y is selected from the group consisting of OR, $O_2CR$, halogen, $CO_2H$, COR, $CO_2R$, CN, $CONH_2$, CONHR, $CONR_2$ and R';

R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, primary amino, secondary amino, tertiary amino, isocyanato, sulfonic acid and halogen; and the number of carbons in said alkyl groups is from 1 to 12; and R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefin and halogen;

by contacting said CM with a cobalt-containing chain transfer agent and a free radical initiator at a temperature from about 25° C. to 240° C.;

the improvement which comprises adding an olefinically-unsaturated organic molecule, UO, of the structure

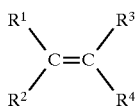

wherein $R^1$ and $R^3$ are each independently selected from the group (I) consisting of —CH(O), —CN and halogen, and from the group (II) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, and substituted aryl; wherein when $R^1$ or $R^3$ are selected from group II, $R^1$ and $R^3$ may optionally form a cyclic structure; and $R^2$ and $R^4$ are each independently selected from the group (III) consisting of H, —CH(O), —CN and halogen, and from the group (IV) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, and substituted aryl; wherein when $R^2$ or $R^4$ are selected from group IV, $R^2$ and $R^4$ may optionally form a cyclic structure;

$R^5$, $R^6$, $R^7$, $R^8$, $R^9$, $R^{10}$, $R^{11}$, and $R^{12}$ are H, alkyl, aryl, substituted alkyl or substituted aryl; $R^{13}$ is alkyl, aryl, substituted alkyl or substituted aryl;

wherein the alkyl and substituted alkyl are $C_1$–$C_{12}$, and the substituents on the substituted alkyl or aryl contain no functionality which would substantially interfere with free radical polymerization (e.g., groups known to be free-radical chain terminators such as thiols or nitroxides).

In another embodiment at least one of $R^1$ and $R^2$ are hydrogen, and $R^3$ and $R^4$ are each independently selected from the group (I) consisting of —CH(O), —CN and halogen, and from the group (II) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, and substituted aryl; wherein when $R^3$ or $R^4$ are selected from group II, $R^3$ and $R^4$ may optionally form a cyclic structure; or an embodiment where:

$R^3$ and $R^4$ are each independently selected from the group (III) consisting of H, —CH(O), —CN and halogen, and from the group (IV) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, and substituted aryl; wherein when $R^3$ or $R^4$ are selected from group IV, $R^1$ and $R^2$ may optionally form a cyclic structure;

$R^5$, $R^6$, $R^7$, $R^8$, $R^9$, $R^{10}$, $R^{11}$, and $R^{12}$ are H, alkyl, aryl, substituted alkyl or substituted aryl; $R^{13}$ is alkyl, aryl, substituted alkyl or substituted aryl;

wherein the alkyl and substituted alkyl are $C_1$–$C_{12}$, and the substituents on the substituted alkyl or aryl contain no functionality which would substantially interfere with free radical polymerization (e.g., groups known to be free-radical chain terminators such as thiols or nitroxides).

This invention further relates to the products made by the above process.

This invention further relates to a macromonomer comprised of an olefinically-unsaturated organic molecule and at least one conventional monomer, said macromonomer represented by

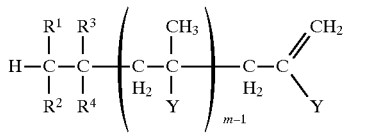

where m ranges from 1 to 100, preferably 2 to 20 and most preferably 2 to 10, and where the starting olefinically-unsaturated organic may be represented by formula (A)

$R^1R^2C=CR^3R^4$           (A)

wherein $R^1$, $R^2$, $R^3$ and $R^4$ are each independently selected from the group consisting of H, —CH(O), —CN, halogen, —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, and substituted aryl; $R^1$ and $R^3$ or $R^2$ and $R^4$ may be combined in a cyclic structure when $R^1$, $R^2$, $R^3$, or $R^4$ are C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, or substituted aryl;

and further provided that at most 2 of $R^1$, $R^2$, $R^3$ and $R^4$ can be H;

$R^5$, $R^6$, $R^7$, $R^8$, $R^9$, $R^{10}$, $R^{11}$, and $R^{12}$ are H, alkyl, aryl, substituted alkyl or substituted aryl; $R^{13}$ is alkyl, aryl, substituted alkyl or substituted aryl;

wherein the alkyl and substituted alkyl are $C_1$–$C_{12}$, and the substituents on the substituted alkyl or aryl contain no functionality which would substantially interfere with free radical polymerization (e.g., groups known to be free-radical chain terminators such as thiols or nitroxides);

Y is selected from the group consisting of OR, $O_2$CR, halogen, $CO_2$H, COR, $CO_2$R, CN, $CONH_2$, CONHR, $CONR_2$ and R';

R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, primary amino, secondary amino, tertiary amino, isocyanato, sulfonic acid and halogen; and the number of carbons in said alkyl groups is from 1 to 12; and R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefin and halogen;

said conventional monomer (CM) is selected from the group consisting of styrenes, acrylates, vinyl pyridines, methacrylates, α-methylstyrenes, vinyl pyrrolidones, chloroprene, and other monomers known to undergo catalytic chain transfer in the presence of cobalt catalysts.

This invention also relates to macromonomers as described above with the proviso that both $R^1$ and $R^2$ cannot be H at the same time.

DETAILS OF THE INVENTION

The macromonomers of this invention are formed by the polymerization of unreactive, olefinically-unsaturated organic molecules (UO) with other conventional monomers (CM herein) in the presence of cobalt complexes capable of effecting chain transfer catalysis (CTC). By UO is generally meant an internal olefinic monomer or other unsaturated monomeric species which does not homopolymerize or copolymerize to an appreciable extent with conventional monomers (CM) which are known to be subject to CTC-for instance, methacrylates, methacrylonitrile, α-methylstyrene and the like, as well as their fluorinated analogs. By "not copolymerize to an appreciable extent" is meant that these olefinically unsaturated organic molecules copolymerize with conventional monomers at levels less than ten mole percent relative to the conventional monomer even when present in a tenfold excess relative to the conventional monomers. Often these molecules will inhibit the copolymerizations.

Preferred metallic chain transfer catalysts for use in making the present materials are cobalt (II) and (III) chelates. Examples of such cobalt compounds are disclosed in U.S. Pat. No. 4,680,352, U.S. Pat. No. 4,694,054, U.S. Pat. No. 5,324,879, WO 87/03605 published Jun. 18, 1987, U.S. Pat. No. 5,362,826, and U.S. Pat. No. 5,264,530. Other useful cobalt compounds (cobalt complexes of porphyrins, phthalocyanines, tetraazoporphyrins, and cobaloximes) are respectively disclosed in Enikolopov, N. S., et al., USSR Patent 664,434 (1978); Golikov, I., et al., USSR Patent 856,096 (1979); Belgovskii, I. M., USSR Patent 871,378 (1979); and Belgovskii, I. M., et al., USSR Patent 1,306,085 (1986). These catalysts operate at close to diffusion-controlled rates and are effective at part-per-million concentrations. Examples of these cobalt (II) and cobalt (III) chain transfer catalysts include, but are not limited to, those represented by the following structures:

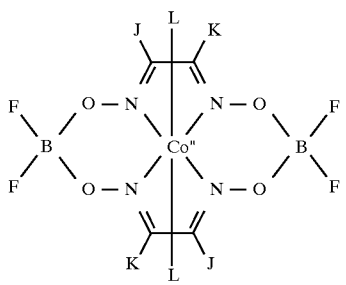

| Co(II)(DPG-BF$_2$)$_2$ | J = K = Ph, L = ligand |
| Co(II)(DMG-BF$_2$)$_2$ | J = K = Me, L = ligand |
| Co(II)(EMG-BF$_2$)$_2$ | J = Me, K = Et, L = ligand |
| Co(II)(DEG-BF$_2$)$_2$ | J = K = Et, L = ligand |
| Co(II)(CHG-BF$_2$)$_2$ | J = K = —(CH$_2$)$_4$—, L = ligand |

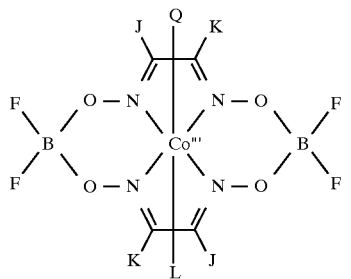

| QCo(III)(DPG-BF$_2$)$_2$ | J = K = Ph, R = alkyl, L = ligand |
| QCo(III)(DMG-BF$_2$)$_2$ | J = K = Me, R = alkyl, L = ligand |
| QCo(III)(EMG-BF$_2$)$_2$ | J = Me, K = Et, R = alkyl, L = ligand |
| QCo(III)(DEG-BF$_2$)$_2$ | J = K = Et, R = alkyl, L = ligand |
| QCo(III)(CHG-BF$_2$)$_2$ | J = K = —(CH$_2$)$_4$—, R = alkyl, L = ligand |
| QCo(III)(DMG-BF$_2$)$_2$ | J = K = Me, R = halogen, L = ligand |

L can be a variety of additional neutral ligands commonly known in coordination chemistry. Examples include water, amines, ammonia, phosphines. The catalysts can also include cobalt complexes of a variety of porphyrin molecules such as tetraphenylporphyrin, tetraanisylporphyrin, tetramesitylporphyrin and other substituted species. Q is an organic radical (e.g., alkyl or substituted alkyl); preferred Q groups are isopropyl, 1-cyanoethyl, and 1-carbomethoxyethyl.

When Co CTC catalysts are present, chains are initiated with a single UO followed by polymerization of the conventional monomers until CTC takes place. When the CTC occurs, the polymer chain is terminated by loss of a hydrogen atom, producing a terminally-unsaturated macromonomer; the hydrogen atom is transferred by the Co catalyst to a new UO, thereby initiating a new polymer chain. The resulting macromonomers therefore contain one functional group derived from the UO and a terminal double bond on the end (vinylidene unsaturation). By vinylidene unsaturation derived from hydrogen atom abstraction from CM is meant the group YPC=CH$_2$
wherein Y is selected from the group consisting of OR, O$_2$CR, halogen, CO$_2$H, COR, CO$_2$R, CN, CONH$_2$, CONHR, CONR$_2$ and R';

R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, primary amino, secondary amino, tertiary amino, isocyanato, sulfonic acid and halogen; and the number of carbons in said alkyl groups is from 1 to 12; and R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefin and halogen; and P is a polymeric or oligomeric group resulting from addition of a conventional monomer to polymeric or oligomeric radicals.

The general reaction scheme may be summarized as Equation 1:

$$UO + CM + Co\ CTC \rightarrow UO_f(CM)_m + (CM)_p \qquad (1)$$

The coproduct designated (CM)$_p$ is unavoidable, but its presence can be minimized by starved-feed reaction conditions. The degrees of polymerization (m) and (p) are controlled by the level of added Co CTC but m ranges from 1 to 100, preferably from 2 to 20, and most preferably from 2 to 10, while p ranges from 2 to 100, and is generally similar to m.

In cases where some minimal level of copolymerization of the UO occurs, the general reaction scheme may be described by Equation 2:

$$UO + CM + Co\ CTC \rightarrow UO_f(CM)_m + (UO)_n(CM)_m + (CM)_p \qquad (2)$$

The degree of polymerization (n) is controlled by the reactivity ratio of the UO and the CM, but n is generally 2 and seldom higher than 4. For the most useful products, the resulting macromonomers will contain one UO and two to 20 CM; thus, the mole ratio of UO:CM will range from about 1:2 to about 1:20. The control experiments described within the examples demonstrate this.

The general formula for the UO's is:

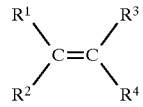

wherein

R$^1$ and R$^3$ are each independently selected from the group (I) consisting of —CH(O), —CN and halogen, and from the group (II) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, and substituted aryl; wherein when R$^1$ or R$^3$ are selected from group II, R$^1$ and R$^3$ may optionally form a cyclic structure; and R$^2$ and R$^4$ are each independently selected from the group (III) consisting of H, —CH(O), —CN and halogen, and from the group (IV) consisting of —C(O)OR$^5$, —C(O)NR$^6$R$^7$, —CR$^8$(O), —C(O)OC(O)R$^9$, —C(O)NR$^{10}$COR$^{11}$, —OC(O)R$^{12}$, —OR$^{13}$, alkyl, substituted alkyl, aryl, and substituted aryl; wherein when R$^2$ or R$^4$ are selected from group IV, R$^2$ and R$^4$ may optionally form a cyclic structure;

R$^5$, R$^6$, R$^7$, R$^8$, R$^9$, R$^{10}$, R$^{11}$, and R$^{12}$ are H, alkyl, aryl, substituted alkyl or substituted aryl; R$^{13}$ is alkyl, aryl, substituted alkyl or substituted aryl;

wherein the alkyl and substituted alkyl are C$_1$–C$_{12}$, and the substituents on the substituted alkyl or aryl contain no functionality which would substantially interfere with free radical polymerization (e.g., groups known to be free-radical chain terminators such as thiols or nitroxides).

said conventional monomer (CM) is one or more monomers selected from the group consisting of methacrylates, methacrylonitrile, α-methylstyrene, vinyl pyrrolidone, chloroprene, and other monomers known to undergo catalytic chain transfer in the presence of cobalt chain transfer catalysts;

said cobalt chain transfer catalyst is selected from the group consisting of cobalt(II) or (III) chelates, cobalt porphyrins, cobalt phthalocyanines, cobalt tetraazoporphyrins, cobalt glyoximes, cobalt cobaloximes and other suitable cobalt(II) and cobalt(III) chelates.

By "may form a cyclic structure" is meant that R groups (i.e., $R^1$, $R^2$, $R^3$, $R^4$) which are either attached to the same C of the C=C group, or are "cis" with relation to the "=" may join together to form a cyclic structure. This may be illustrated in the following structures:

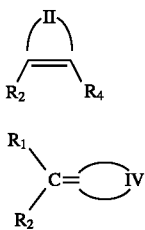

It is recognized by those skilled in the art that these structures are representative, and that there is no reason, for example, that the above $R_2$ and $R_4$, or $R_1$ and $R_2$ could not represent the cyclic moiety in the structures. Example 7 below illustrates this.

Preferred conventional monomers (CM) are: acrylonitrile, methacrylonitrile, vinyl methyl ketone, 4-chlorostyrene, 4-chloromethylstyrene, 2,3-dimethylstyrene, 3,4-dichlorostyrene, 4-bromostyrene, 4-hydroxystyrene, 4-methoxystyrene, 4-oxymethylstyrene, 4-bromomethylstyrene, 4-styrenesulfonic acid, sodium salt of 4-styrenesulfonic acid, 4-styrenesulfoinyl chloride, methyl acrylate, ethyl acrylate, propyl acrylate, 2-hydroxyethyl acrylate, 3-hydroxypropyl acrylate, 2-hydroxypropyl acrylate, butyl acrylate, amyl acrylate, hexyl acrylate, 2-ethylhexyl acrylate, nonyl acrylate, dodecyl acrylate, glycidyl acrylate, acrylamide, N,N'-dimethylacrylamide, bisacrylamide, 2-acrylamido-2-methyl-1-propanesulfonic acid, acrylic acid, sodium salt of acrylic acid, zinc salt of acrylic acid, acryloyl chloride, [2-(acryloyloxy)ethyl]trimethyl ammonium chloride, 2-ethyloxyethyl acrylate, 2-(N,N'-dimethylamino)ethyl acrylate, methacryloyl chloride, methacrylic anhydride, acrylic anhydride, [2-(methacryloyloxy)ethyl]trimethyl ammonium chloride, 2-(methacryloyloxy)ethyl methacrylate, 2-(methacryloyloxy)ethylacetoacetate, [2-(methacryloyloxy)propyl]trimethyl ammonium chloride, vinylchloride, 4-vinylbenzoic acid, vinyl acrylate, vinyl methacrylate, vinyl chloroformate, vinyl pyridine, benzyl acrylate, methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha methyl styrene, trimethoxysilylpropyl methacrylate, triethoxysilylpropyl methacrylate, tributoxysilylpropyl methacrylate, dimethoxymethylsilylpropyl methacrylate, diethoxymethyl-silylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, isopropenyl butyrate, isopropenyl acetate, isopropenyl benzoate, isopropenyl chloride, isopropenyl fluoride, isopropenyl bromide, itaconic acid, itaconic anhydride, dimethyl itaconate, methyl itaconate, N-tert-butyl methacrylamide, N-n-butyl methacrylamide, N-methyl-ol methacrylamide, N-ethyl-ol methacrylamide, isopropenylbenzoic acid (all isomers), diethylamino alpha-methylstyrene (all isomers), para-methyl-alpha-methylstyrene (all isomers), diisopropenylbenzene (all isomers), isopropenylbenzene sulfonic acid (all isomers), methyl 2-hydroxymethylacrylate, ethyl 2-hydroxymethylacrylate, propyl 2-hydroxymethylacrylate (all isomers), butyl 2-hydroxymethylacrylate (all isomers), 2-ethylhexyl 2-hydroxymethylacrylate, isobornyl 2-hydroxymethylacrylate, methyl 2-chloromethylacrylate, ethyl 2-chloromethylacrylate, propyl 2-chloromethylacrylate (all isomers), butyl 2-chloromethylacrylate (all isomers), 2-ethylhexyl 2-chloromethylacrylate, isobornyl 2-chloromethylacrylate, chloroprene, and vinylpyrrolidone.

Preferred olefinically unsaturated organic molecules (UO) are: butenenitrile (all isomers), pentenenitrile (all isomers), methyl butenecarboxylate (all isomers), ethyl butenecarboxylate (all isomers), propyl butenecarboxylate (all isomers), butyl butenecarboxylate (all isomers), 2-ethylhexyl butenecarboxylate (all isomers), methyl pentenecarboxylate (all isomers), ethyl pentenecarboxylate (all isomers), perfluoro(propylvinyl)ether, methyl cinnamate, ethyl cinnamate, propyl cinnamate (all isomers), cinnamonitrile, methylmaleic anhydride, cyclopenten-1-one, cyclohexen-1-one, cyclohepten-1-one, dimethyl maleate, dimethyl fumarate, diethyl maleate, methyl crotonate, ethyl crotonate, crotonaldehyde, crotononitrile, methylfumaronitrile, diphenylethylene (all isomers), triphenylethylene, methyl octadecen-2-oate, ethyl octadecen-2-oate, methyl hexadecen-2-oate, ethyl hexadecen-2-oate, coumarin, methyl coumarin-3-carboxylate, and methylitaconic anhydride.

The UO can be utilized as the polymerization "solvent", in that there is a preponderance of it, and the other monomer (s) (CM) ideally would be added in a starved-feed manner to allow optimum control of the design of the product. The UO is truly monomeric, i.e., no macromonomers are present as starting material. The UO's used could be products or by-products from other processes, e.g., the thermodynamically-isomerized, conjugated products, EtHC=CHCN from the monohydrocyanation of butadiene, EtHC=CHCO$_2$H from the hydrocarboxylation of butadiene, EtHC=CHCO$_2$Me from the carbomethoxylation of butadiene, or 2-cyanocyclooctene from the hydrocyanation of cyclooctadiene. Additionally, they may be esters of unsaturated fatty acids or preferably esters of unsaturated fatty acids which have been isomerized to the conjugated products.

An initiator which produces carbon-centered radicals, sufficiently mild not to destroy the metal chelate chain transfer catalyst, is typically also employed in preparing the polymers. Suitable initiators are azo compounds having the requisite solubility and appropriate half life, including azocumene; 2,2'-azobis(2-methyl)-butanenitrile; 2,2'-azobis (isobutyronitrile)(AIBN); 4,4'-azobis(4-cyanovaleric acid); and 2-(t-butylazo)-2-cyanopropane, and other compounds known to those skilled in the art.

The polymerization process, employing the above described metallic chain transfer catalysts, is suitably carried out at a temperature ranging from about room temperature to about 240° C. or higher, preferably about 50° C. to 150° C. The polymers made by the inventive process are typically prepared in a polymerization reaction by standard solution polymerization techniques, but may also be prepared by emulsion, suspension or bulk polymerization processes. A continuous (CSTR) polymerization process may also be used. The polymerization process can be carried out as either a batch, semi-batch, or continuous process. When carried out in the batch mode, the reactor is typically charged with metal chain transfer catalyst, a conventional monomer, and the unsaturated organic, optionally with a solvent. To the mixture is then added the desired amount of initiator, typically such that the monomer-to-initiator ratio is 5 to 1000. The mixture is then heated for the requisite time, usually about 30 minutes to about 12 hours. In a batch process, the reaction may be run under pressure to avoid monomer reflux.

The terminally unsaturated oligomers or macromonomers prepared according to the present invention can be employed, not only as non-metallic chain transfer agents, but as useful components or intermediates in the production of graft copolymers, non-aqueous dispersed polymers, microgels, star polymers, branched polymers, and ladder polymers.

Oligomers, macromonomers and polymers made by the present process are useful in a wide variety of coating and molding resins. Other potential uses can include cast, blown, spun or sprayed applications in fiber, film, sheet, composite materials, multilayer coatings, photopolymerizable materials, photoresists, surface active agents, dispersants, adhesives, adhesion promoters, coupling agents, and others. End products taking advantage of available characteristics can include, for example, automotive and architectural coatings or finishes, including high solids, aqueous, or solvent based finishes. Polymers, such as those produced in this invention would find use in, for example, structured polymers for use as pigment dispersants.

The freeze-pump-thaw cycle as used in the examples below is described in D. F. Shriver, et al., "The Manipulation of Air Sensitive Compounds", 2nd ed., Wiley Interscience, 1986.

$^1$H-NMR spectra were taken on a QE300 NMR spectrometer (General Electric Co., Freemont, Calif. 94539) at 300 MHz frequency.

$K^+$ IDS mass spectroscopy is an ionization method that produces pseudomolecular ions in the form of $[M]K^+$ with little or no fragmentation. Intact organic molecules are desorbed by rapid heating. In the gas phase the organic molecules are ionized by potassium attachment. Potassium ions are generated from an aluminosilicate matrix that contains $K_2O$. All of these experiments were performed on a Finnegan Model 4615 GC/MS quadrupole mass spectrometer (Finnegan MAT (USA), San Jose, Calif.). An electron impact source configuration operating at 200° C. and a source pressure of $<1\times10^{-6}$ torr was used.

MW and DP measurements were based on gel permeation chromatography (GPC) using styrene as a standard, and performed on a WISP 712 Chromatograph with 100 A, 500 A, 1000 A and 5000 A phenogel columns (Waters Corp., Marlborough, Mass. 01752-9162). $M_{pic}$ is a measure of the molecular weight of the largest molecular ion signal obtained with $K^+$ IDS, and is generally a value between MN and MW.

DEFINITIONS

Unless otherwise identified, all chemicals and reagents were used as received from Aldrich Chemical Co., Milwaukee, Wis.

MMA=methyl methacrylate
2-PN=2-pentenenitrile
TAPCo=meso-tetra(4-methoxyphenyl)porphyrin-Co
VAZO-88®=1,1'-azobis(cyclohexane-1-carbonitrile (DuPont Co., Wilmington, Del.)
AIBN=2,2'-azobis(isobutyronitrile)
THPCo=tetrakis(4-hexylphenyl)porphyrin-Co
DMM=dimethyl maleate
EC=ethyl crotonate
DEM=diethyl maleate
CPO=cyclopentene-1-one
PPVE=perfluoro(propylvinyl)ether

EXAMPLES

Example 1

Initiation of MMA with 2-PN

A solution of 2 mg of TAPCo, 2.6 mg of VAZO®-88, 0.6 mL of 1,2-dichloroethane, 0.4 mL of 2-PN and 0.04 mL of MMA was degassed by three freeze-pump-thaw cycles, sealed and immersed into a 90° C. circulating bath for 2 hours. The solution was sealed and another portion of 0.04 mL of MMA was added promptly. Then it was degassed as described above and immersed into a 90° C. isothermal bath for an additional 2 hours.

The same procedure as described above was repeated at 100° C. at 30 min intervals, and at 110° C. at 15 min intervals.

$K^+$ IDS analysis showed that in all three cases approximately 30% of a polymer product with a DP of approximately 3 contained only one 2-PN unit per polymer molecule. The control experiments made as described above but without TAPCo gave polyMMA with less than 1% of 2-PN incorporated into the polymer, according to NMR data.

Example 2

Initiation of MMA with 2-cyano-2-butene

A solution of 4 mg of TAPCo, 2 mg of AIBN, 0.7 mL of chloroform, 0.3 mL of 2-cyano-2-butene and 0.08 mL of MMA was degassed by three freeze-pump-thaw cycles, sealed and immersed into a 70° C. circulating bath for 2 hours. The solution was sealed and 0.06 mL of MMA was added promptly. Then it was degassed as described above and immersed into a 70° C. isothermal bath for an additional three hours. Then another 0.06 mL of MMA was added and the solution was kept at 70° C. for another three hours.

$K^+$ IDS analysis showed that in all three cases approximately 10% of the polymer product with a DP of approximately 3 contained only one 2-cyano-2-butene unit per polymer molecule.

Example 3

Initiation of MMA with crotonaldehyde

A 0.04 mL aliquot of MMA was added to a reaction mixture which contained 5 mg THPCo, 0.9 mL of crotonaldehyde and 8 mg VAZO®-88. The reaction solution was then degassed by three freeze-pump-thaw cycles, sealed and immersed into a 100° C. circulating bath for one hour.

The above procedure was repeated two more times. According to proton-NMR of the vacuum-evaporated sample, approximately 60% of the formed polymeric product with a DP of approximately 5 contained aldehyde groups. $K^+$ IDS analysis showed that the reaction product consisted of oligoMMA and some copolymer (unresolved spectrum).

The control experiment run as described above, but without THPCo, gave polyMMA with less than 1% of crotonaldehyde incorporated into the polymer, according to NMR data.

Example 4

Initiation of MMA with DMM

A 0.04 mL aliquot of MMA was added to a reaction mixture which contained 5 mg THPCo, 0.9 mL of DMM and 8 mg VAZO®-88. The reaction solution was then degassed by three freeze-pump-thaw cycles, sealed and immersed into a 100° C. circulating bath for one hour.

The above procedure was repeated two more times, but at 90 min and 150 min of heating time. $K^+$ IDS analysis showed that only approximately 15% of MMA homopolymer was formed. About 50% of the remaining portion of the polymer product contained one DMM unit per molecule, and the other ~50% contained mostly two DMM units. GPC showed the DP was approximately 5.

Example 5

Initiation of MMA with EC

A 0.04 mL aliquot of MMA was added to a reaction mixture which contained 3 mg THPCo, 0.9 mL of EC and 8 mg of VAZO®-88. The reaction solution was then degassed by three freeze-pump-thaw cycles, sealed and immersed into a 100° C. circulating bath for 60 min.

The above procedure was repeated two more times. A product with a DP of approximately 4 was obtained. $K^+$ IDS analysis showed that only approximately 18% MMA homopolymer was formed. About 60% of the remaining polymer product contained one EC unit per molecule, and about 40% contained mostly two EC units per molecule.

Example 6

Initiation of MMA with DEM

A 0.08 mL aliquot of MMA was added to a reaction mixture containing 2 mg THPCo, 1.8 mL DEM and 16 mg VAZO®-88. The reaction solution was then degassed by three freeze-pump-thaw cycles, sealed and immersed into a 100° C. circulating bath for one hour.

The above procedure was repeated two more times, but with 90 min and 150 min heating times. A product with a DP of approximately 3.5 was obtained. $K^+$ IDS analysis showed that only approximately 30% of MMA homopolymer was formed. About 70% of the remaining polymer product contained one DEM unit per molecule, and the remaining 30% contained mostly two DEM units per molecule.

The control experiment as described above, but without THPCo, gave polyMMA with 6% of EC incorporated into the polymer, according to NMR data.

Example 7

Initiation of MMA with CPO

A 0.08 mL aliquot of MMA was added to a reaction mixture which contained 1 mg bis(diphenylglyoxime)-(triphenylphosphine)cobalt(III)chloride, 1.8 mL CPO and 16 mg VAZO®-88. The reaction solution was then degassed by three freeze-pump-thaw cycles, sealed and immersed into a 100° C. circulating bath for 40 min.

The above procedure was repeated two more times, but with 90 min and 150 min heating times. A product with a DP of approximately 3 was obtained. $K^+$ IDS analysis showed that approximately 58% of MMA/CPO copolymer was formed. Approximately 90% of this copolymer contained only one CPO unit per molecule.

Example 8

Copolymerization of UO

A 2.4 mL aliquot of MMA was added to a reaction mixture which contained 10 mg THPCo, 6 mL dichloroethane, 0.12 g VAZO®-88, 3 mL FREON-113 and 9 mL PPVE. The MMA was added three times and after each addition, the reaction solution was degassed and kept at 100° C. for 60 minutes.

A polymer product obtained after evaporation had a $M_{pic}$=800. According to $K^+$ IDS analysis, 15% of of polyMMA contained one molecule of PPVE.

What is claimed is:

1. In a process for the free-radical polymerization of one or more monomers to form a polymer having vinyl-terminated end groups, said polymerization being initiated by a functional group derived from an olefinically-unsaturated organic molecule, the monomers having the structure:

$$CH_2=CXY$$

wherein

X is selected from the group consisting of $CH_3$ and $CH_2OH$:

Y is selected from the group consisting of OR, $O_2CR$, halogen, $CO_2H$, COR, $CO_2R$, CN, $CONH_2$, CONHR, $CONR_2$ and R';

R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, primary amino, secondary amino, tertiary amino, isocyanato, sulfonic acid and halogen; and the number of carbons in said alkyl groups is from 1 to 12; and R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefin and halogen;

said polymerization proceeding by contacting said monomers with a chain transfer catalyst, comprising a cobalt (II) or cobalt (III) catalyst, and a free radical initiator at a temperature from about 25° to 240° C.;

the improvement comprising adding an olefinically-unsaturated organic molecule of the structure

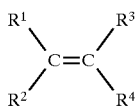

wherein
- R¹ and R³ are each independently selected from the group (I) consisting of —CH(O), —CN and halogen, and from the group (II) consisting of —C(O)OR⁵, —C(O)NR⁶R⁷, —CR⁸(O), —C(O)OC(O)R⁹, —C(O)NR¹⁰COR¹¹, —OC(O)R¹², —OR¹³, alkyl, substituted alkyl, aryl, and substituted aryl; wherein when R¹ or R³ are selected from group II, R¹ and R³ may optionally form a cyclic structure; and
- R² and R⁴ are each independently selected from the group (III) consisting of H, —CH(O), —CN and halogen, and from the group (IV) consisting of —C(O)OR⁵, —C(O)NR⁶R⁷, —CR⁸(O), —C(O)OC(O)R⁹, —C(O)NR¹⁰COR¹¹, —OC(O)R¹², —OR¹³, alkyl, substituted alkyl, aryl, and substituted aryl; wherein when R² or R4 are selected from group IV, R² and R⁴ may optionally form a cyclic structure; R⁵, R⁶, R⁷, R⁸, R⁹, R¹⁰, R¹¹, and R12 are H, alkyl, aryl, substituted alkyl or substituted aryl; R¹³ is alkyl, aryl, substituted alkyl or substituted aryl;
- wherein the alkyl and substituted alkyl are C1–C12; and the substituents on the substituted alkyl or aryl contain no functionality which would substantially interfere with free radical polymerization, and wherein said olefinically unsaturated organic molecule reinitiates polymerization to form a macromonomer.

2. The process as recited in claim 1, wherein said temperature is between about 50° C. and about 150° C.

3. The process as recited in claim 1, wherein said process is a batch process.

4. The process as recited in claim 1, wherein said process is a semi-batch process.

5. The process as recited in claim 1, wherein said process is a continuous process.

6. In a process for the free-radical polymerization of one or more monomers to form a polymer having vinyl-terminated end groups, said polymerization being initiated by a functional group derived from an olefinically-unsaturated organic molecule, the monomers having the structure;

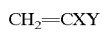
CH₂=CXY wherein
- X is selected from the group consisting of CH₃ and CH₂OH;
- Y is selected from the group consisting of OR, O₂CR, halogen, CO₂H, COR, CO₂R, CN, CONH₂, CONHR, CONR₂ and R';
- R is selected from the group consisting of substituted and unsubstituted alkyl, substituted and unsubstituted aryl, substituted and unsubstituted heteroaryl, substituted and unsubstituted aralkyl, substituted and unsubstituted alkaryl, and substituted and unsubstituted organosilyl, the substituents being the same or different and selected from the group consisting of carboxylic acid, carboxylic ester, epoxy, hydroxyl, alkoxy, primary amino, secondary amino, tertiary amino, isocyanato, sulfonic acid and halogen; and the number of carbons in said alkyl groups is from 1 to 12; and
- R' is selected from the aromatic group consisting of substituted and unsubstituted aryl, substituted and unsubstituted heteroaryl, the substituents being the same or different and selected from the group consisting of carboxylic acid, carboxylic ester, epoxy, hydroxyl, alkoxy, primary amino, secondary amino, tertiary amino, isocyanato, sulfonic acid, substituted and unsubstituted alkyl, substituted and unsubstituted aryl, substituted and unsubstituted olefin and halogen;
- said polymerization proceeding by contacting said monomers with a chain transfer catalyst, comprising a cobalt (II) or cobalt (III) catalyst, and a free radical initiator at a temperature from about 25° to 240° C.;
- the improvement comprising adding an olefinically-unsaturated organic molecule of the structure

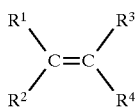

wherein R¹ and R² are hydrogen, and R³ and R⁴ are each independently selected from the group (I) consisting of —CH(O), —CN and halogen, and from the group (II) consisting of —C(O)OR⁵, —C(O)NR⁶R⁷, —CR⁸(O), —C(O)OC(O)R⁹, —C(O)NR¹⁰COR¹¹, —OC(O)R¹², —OR¹³, alkyl, substituted alkyl, aryl, and substituted aryl; wherein when R³ or R⁴ are selected from group II, R³ and R⁴ may optionally form a cyclic structure; or wherein
- R³ and R⁴ are each independently selected from the group (III) consisting of H, —CH(O), —CN and halogen, and from the group (IV) consisting of —C(O)OR⁵, —C(O)NR⁶R⁷, —CR⁸(O), —C(O)OC(O)R⁹, —C(O)NR¹⁰COR¹¹, —OC(O)R¹², —OR¹³, alkyl, substituted alkyl, aryl, and substituted aryl; wherein when R³ or R⁴ are selected from group IV, R³ and R⁴ may optionally form a cyclic structure;
- R⁵, R⁶, R⁷, R⁸, R⁹, R¹⁰, R¹¹, and R¹² are H, alkyl, aryl, substituted alkyl or substituted aryl; R¹³ is alkyl, aryl, substituted alkyl or substituted aryl;
- wherein the alkyl and substituted alkyl are C₁–C₁₂, and the substituents on the substituted alkyl or aryl contain no functionality which would substantially interfere with free radical polymerization, and wherein said olefinically unsaturated organic molecule reinitiates polymerization to form a macromonomer.

7. The process as recited in claim 6, wherein said temperature is between about 50° C. and about 150° C.

8. The process as recited in claim 6, wherein said process is carried on in a process configuration selected from the group consisting of a batch process, a continuous process or a semi-batch process.

* * * * *